(12) United States Patent
Fenaughty

(10) Patent No.: US 8,480,363 B2
(45) Date of Patent: Jul. 9, 2013

(54) SELF-STARTING TURBINE WITH DUAL POSITION VANES

(76) Inventor: Thomas Mellus Fenaughty, Fremont, CA (US)

( * ) Notice: Subject to any disclaimer, the term of this patent is extended or adjusted under 35 U.S.C. 154(b) by 694 days.

(21) Appl. No.: 12/685,503

(22) Filed: Jan. 11, 2010

(65) Prior Publication Data

US 2010/0310370 A1    Dec. 9, 2010

Related U.S. Application Data

(60) Provisional application No. 61/183,672, filed on Jun. 3, 2009.

(51) Int. Cl.
*F03D 7/06* (2006.01)

(52) U.S. Cl.
USPC ........ 416/1; 416/17; 416/32; 416/41; 416/46; 416/111; 416/132 B; 416/142; 416/197 A; 415/1; 415/4.2; 415/4.4

(58) Field of Classification Search
USPC ......... 416/1, 17, 32, 41, 46, 111, 119, 132 B, 416/142, 197 A; 415/1, 4.1, 4.2, 4.4
See application file for complete search history.

(56) References Cited

U.S. PATENT DOCUMENTS

| | | | |
|---|---|---|---|
| 1,314,232 A * | 8/1919 | Wohr | 416/119 |
| 1,804,493 A * | 5/1931 | Benjamins | 416/32 |
| 2,406,268 A * | 8/1946 | Terhune | 416/46 |
| 4,248,568 A * | 2/1981 | Lechner | 416/132 B |
| 4,457,669 A * | 7/1984 | Corry | 416/119 |
| 4,468,169 A * | 8/1984 | Williams | 416/119 |
| 4,681,512 A | 7/1987 | Barnard | |
| 4,776,762 A * | 10/1988 | Blowers, Sr. | 416/119 |
| 4,979,871 A | 12/1990 | Reiner | |
| 5,252,029 A | 10/1993 | Barnes | |
| 5,676,524 A | 10/1997 | Lukas | |
| 6,283,710 B1 | 9/2001 | Biscomb | |
| 6,394,745 B1 * | 5/2002 | Quraeshi | 415/4.1 |
| 6,688,842 B2 | 2/2004 | Boatner | |
| 8,035,245 B1 * | 10/2011 | Simnacher | 290/55 |
| 2003/0049128 A1 | 3/2003 | Rogan | |
| 2003/0185666 A1 | 10/2003 | Ursua | |
| 2006/0198724 A1 | 9/2006 | Bertony | |
| 2007/0177970 A1 | 8/2007 | Yokoi | |
| 2009/0136346 A1 | 5/2009 | Kelly | |

* cited by examiner

*Primary Examiner* — Igor Kershteyn

(57) ABSTRACT

A turbine with vanes and tethers that adjust to the wind includes: an axle, adapted to be positioned perpendicular to the airflow; a radial spar attached to the axle; a vane rotatably attached to the spar; and a positioning element to limit the vane from rotating substantially more than a perpendicular angle away from the spar. The device retains the vane in a position that utilizes the airflow to rotate the axle. The positioning element is a tether attached to the distal point of the vane.

1 Claim, 3 Drawing Sheets

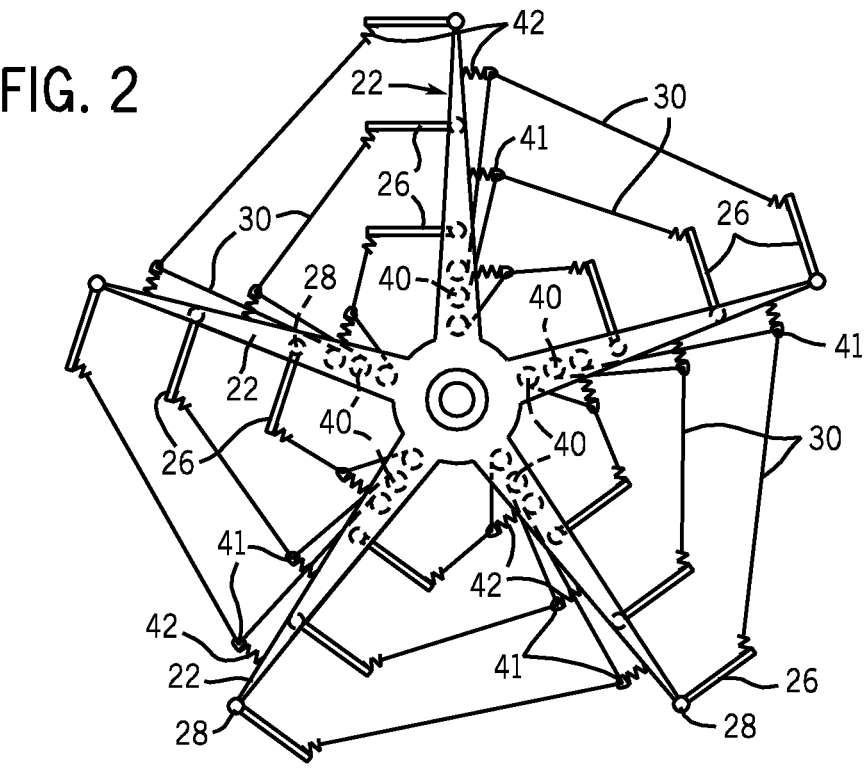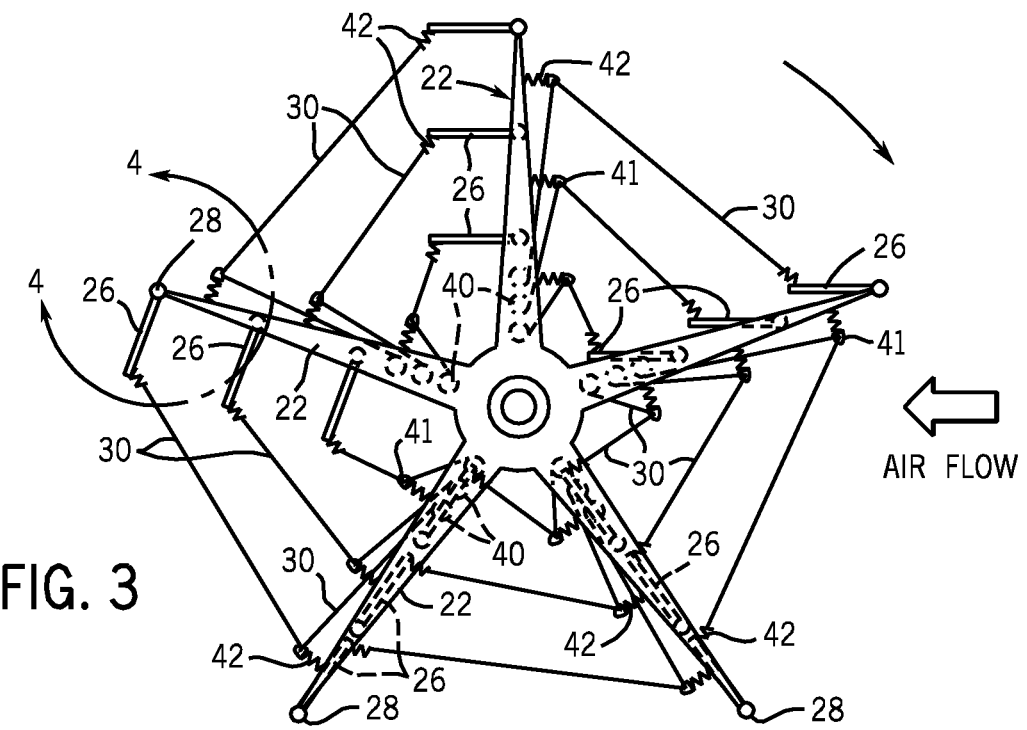

SELF-STARTING TURBINE WITH DUAL POSITION VANES

RELATED APPLICATIONS

The present application claims benefit of priority from U.S. Provisional Application No. 61/183,672, filed Jun. 3, 2009, which is incorporated herein by reference in its entirety.

BACKGROUND OF THE INVENTION

The present invention generally relates to turbines, and more specifically, to a turbine with vanes and tethers that adjust to the wind.

SUMMARY OF THE INVENTION

In one aspect of the present invention, a device utilizing an airflow includes: an axle, adapted to be positioned perpendicular to the airflow; a radial spar attached to the axle; a vane rotatably attached to the spar; and a positioning element to limit the vane from rotating substantially more than a perpendicular angle away from the spar; wherein the device retains the vane in a position that utilizes the airflow to rotate the axle.

in another aspect of the present invention, a device utilizing an airflow includes: an axle, adapted to be positioned perpendicular to the airflow; five, equally-spaced radial spars attached to the axle; a plurality of vanes rotatably attached to each spar, each vane having a proximal point attached to the spar and the distal points generally opposite the proximal point;

and a tether attached to the distal points of each vane of a first spar and attached to an adjacent second spar, at a point on that spar 0.62 times the width of the vane from the hinge point of the vane on the supporting spar, the tether when connected at this point does not need to change length to allow the controlled vane full movement between parallel to its supporting spar and perpendicular to its supporting spar. The winch only lengthens the controlling tethers when the vanes must be released downwind to create an aerodynamic stall of the device.

In yet another embodiment of the present invention, method for rotating an axle includes: providing five equally-spaced spars about the axle, each spar having a vane; providing a tether between the first vane of a first spar of the spars and an adjacent second spar of the spars so that, when the turbine rotates, the tether retains the first vane at a substantial angle to the first spar; and in response to a wind force upon the first vane, urging the turbine to rotate.

These and other features, aspects and advantages of the present invention will become better understood with reference to the following drawings, description and claims.

BRIEF DESCRIPTION OF THE DRAWINGS

FIG. 2 is a top plan schematic view of the embodiment of FIG. 1 at rest;

FIG. 3 is a top plan schematic view of an embodiment of FIG. 1 in motion;

DETAILED DESCRIPTION OF THE INVENTION

The following detailed description is of the best currently contemplated modes of carrying out exemplary embodiments of the invention. The description is not to be taken in a limiting sense, but is made merely for the purpose of illustrating the general principles of the invention, since the scope of the invention is best defined by the appended claims.

Various inventive features are described below that can each be used independently of one another or in combination with other features.

Broadly, an embodiment of the present invention generally provides a compact and powerful vertical-axis wind (or water) turbine for the turning of an axle for the production of electricity or for the pumping of water from wind or moving water.

An embodiment of the present invention includes a vertical-axis turbine that may efficiently capture mechanical energy from wind or moving water to produce electricity or pump water when attached to the appropriate electrical generator or pump. An embodiment of a compact and powerful vertical-axis turbine may be omni-directional, self-starting, has no need of a stator or starter motor of any type, and produces significant horsepower even in low to moderate winds. The vertical-axis turbine efficiently accepts shifting gusts as well as steady winds from any direction, turning in the same direction even in shifting winds and gusts. The vertical-axis turbine creates a compound lift leeward vane system that increases power output across the useable wind speed range. The vertical-axis turbine can be aerodynamically stalled in high winds reducing the requirements for braking systems. Embodiments may be used for the production of electricity or for the pumping of water from wind or moving water. In an embodiment, an upwind spar at the top has vanes 26 fluttering in the upwind position, reducing resistance.

Figure 1:
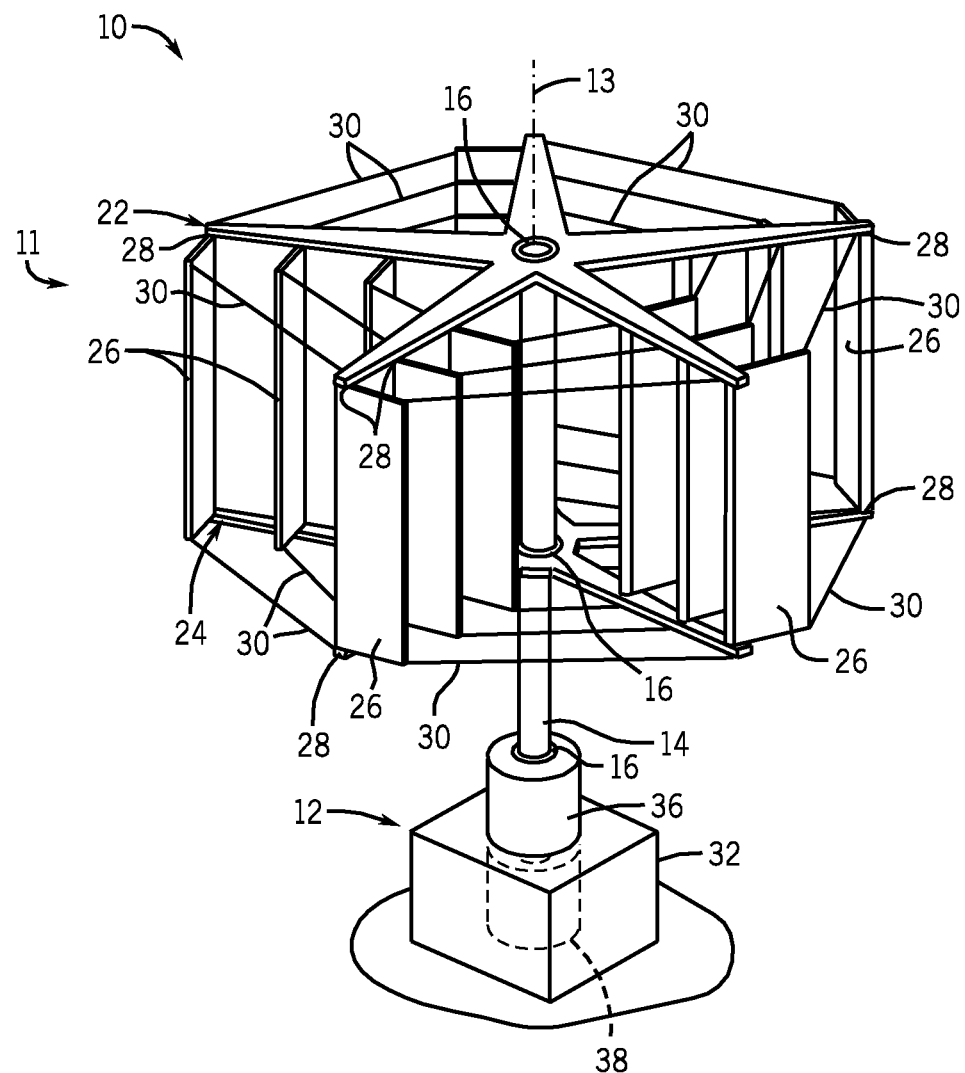
FIG. 1 is a schematic perspective view of an embodiment of the present invention at rest.
Figure 4:
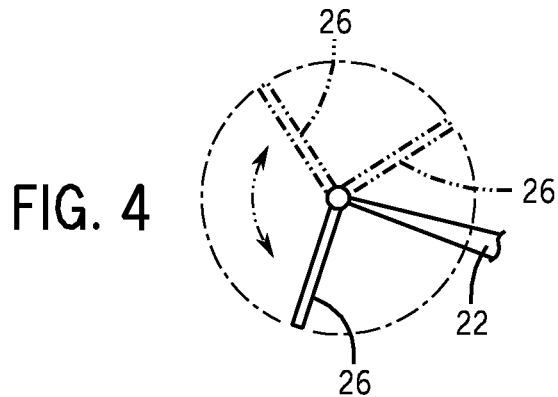
FIG. 4 is top plan schematic view showing a detail of an embodiment of the present invention.
Figure 5:
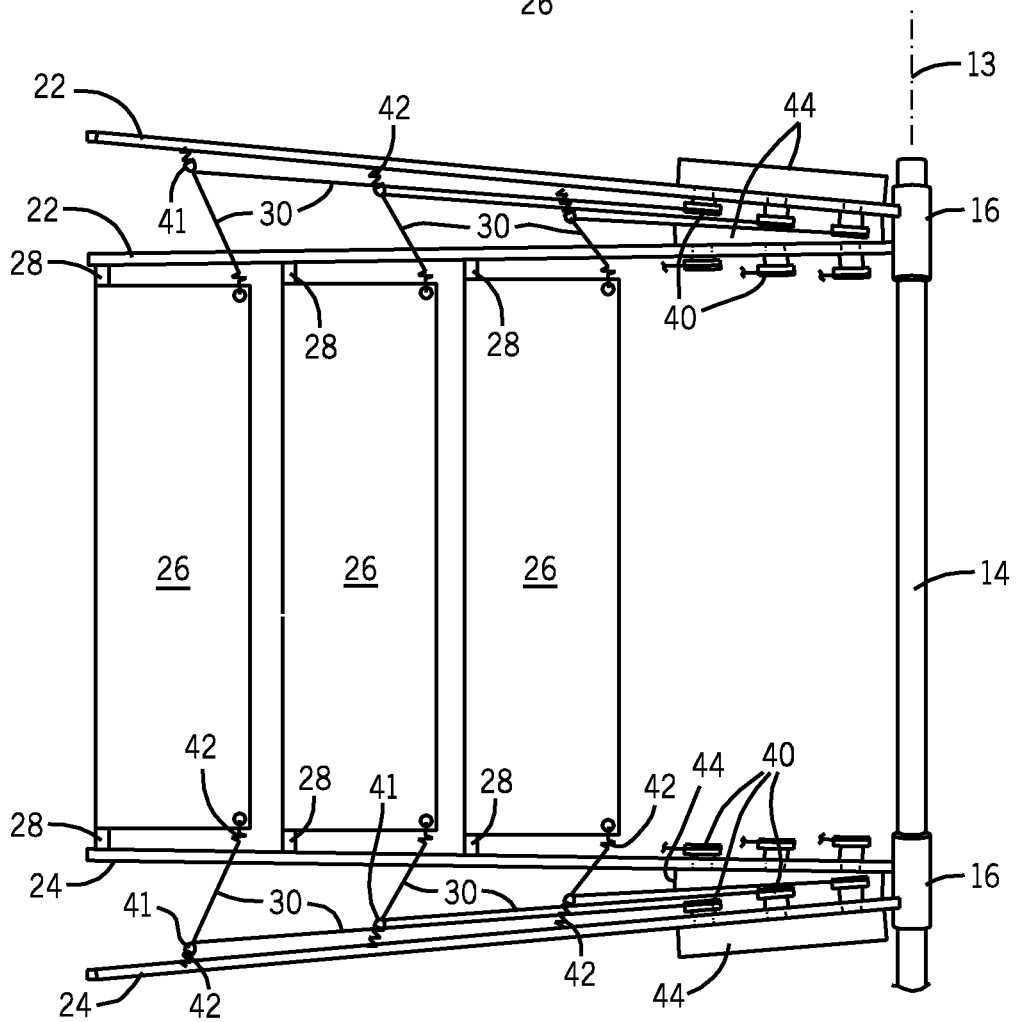
FIG. 5 is a detail perspective view of part of an embodiment of the present invention

An exemplary embodiment of the device includes a vertical-axis turbine, which can also be referred to as "the Fenaughty Turbine." FIG. 1 shows an embodiment of the invention 10 with multiple vanes 26 per spar 22, all in the open position. Also shown is a generator 38. A vertical axle 14 supports, on its upper portion, 5 radial sets of spars 22, 24 set at 72 degrees from one another around the central axle 14. FIG. 2 shows an embodiment 10 from above to show the arrangement of the vanes 26 at working speed, some in the open position and some in the closed position. The lower portion of the central axle 14 may be attached or geared to an appropriate generator 38 or pump for the production of electricity or the pumping of water (FIG. 1). Each spar set 22, 24 connects to the central axle 14 at two points, an upper and a lower connection (FIG. 5). Attached to these 5 spars are vertically-hinged rectangular vanes, the part that catches the wind, one or more per spar. These vanes are hinged at the exterior edge of each spar, allowing them to move from one closed position, parallel along the spar, to a second open position, perpendicular to the spar. FIG. 4 shows the mobility of an embodiment of a single vane 26 in relation to the supporting spar 22, from a parallel position to a position perpendicular to the spar but also allowing full movement of the vane around its hinge to allow the vane to pass through the spar if need be in the stall configuration. The first vane may be hinged on the far extreme of the spar and two or more vanes are placed on each spar, leaving the innermost section of the spar and the center of the device unobstructed. FIG. 3 shows a top view of an arrangement of the vanes 26 at startup when the windward vane may be active by allowing the vanes to reach the closed position seen on the lower spars 22 in the drawing. The vanes are spaced so as not to interfere with each other, and each vane can pass through the spar to a full flutter configuration, enabling a stall configuration with very low aerodynamic resistance (FIG. 5).

In an embodiment, these vanes are hinged and controlled by tethers to open to a 90-degree angle from the spar in the open position (FIG. 2). The moving edge of the vane may be tethered to control its position, and the tethers are attached to the following spar and contain mechanisms to absorb shock encountered at the changing position of the vane. This hinged and tuned vane creates a windward vane, in the closed position and a leeward vane, in the open position, increasing the number of power positions for the vanes of the device. In addition, the multiple vanes also reduce resistance in the up-wind movement as they fold in this position to pass upwind in a flutter configuration, giving little or no resistance, permitting maximum force to be generated from the active vanes.

As seen in the embodiment of FIG. 1, a vertical axle 14 supports, on its upper portion, five radial spars 22 set at 72 degrees from one another around the central vertical axle 14. The lower portion of the central vertical axle 14 may be attached or geared 36 to an appropriate generator 38 or pump, for the production of electricity or the pumping of water. Each spar 22 connects to the upper portion of the central axle 14 at two points, an upper and a lower connection. A bearing 16 supports the upper portion of the device. Attached to these five spars 22 are vertically hinged 28 rectangular vanes 26, being the part that catches the wind, one or more per spar 22. These vanes 26 are hinged along their exterior vertical edge. When in the closed position, the vanes 26 are parallel to the spar 22, and in the open position, the vanes 26 open out to approximately 90 degrees from the spar 22.

As depicted in FIG. 5, in an embodiment, the first rectangular vane 26 may be attached with a hinge 28 on the far extreme (outer portion) of the spars 22, 24. In an embodiment, two or more additional vanes are placed adjacent each other on each spar, leaving the center of the device 10 unobstructed. The vanes 26 are spaced so as to not interfere with each other and each vane can pass through the spar 22 to a full flutter configuration, enabling a stall configuration with very low aerodynamic resistance.

In an embodiment, vanes 26 are hinged 28 and controlled by tethers 30 to open to a 90-degree angle from the spar in the open position. The moving edge of the vane 26 may be tethered to control its position and the tethers are attached to the following spar and contain mechanisms 42 to absorb shock encountered at the changing position of the vane. This hinged and tuned vane creates a windward vane in the closed position and a leeward vane in the open position, increasing the number of power positions for the vanes 26 of the device. In addition, the multiple hinged vanes also reduce resistance in the up-wind movement as they fold in this position to pass upwind in a flutter configuration, giving little or no resistance, permitting maximum force to be generated from the active vanes.

It should be understood, of course, that the foregoing relates to exemplary embodiments of the invention and that modifications may be made without departing from the spirit and scope of the invention as set forth in the following claims.

I claim:

1. A method of turning an axle for the production of power by a self-starting device utilizing an airflow, comprising:
   an axle, adapted to be positioned perpendicular to the airflow;
   five radial sets of supporting spars attached to the axle;
   multiple mutually non-interfering vanes attached to only an outer portion of the supporting spar set, each vane rotatably attached to each of the spars; and
   a positioning element for each vane to limit the movement of each vane from rotating substantially more than a perpendicular or parallel angle from its supporting spar;
   wherein the device retains each vane in a position that utilizes the airflow to rotate the axle the method comprising the steps of:
      rotating the mutually non-interfering vanes in combination with the positioning element that allows each vane to past downwind creating an aerodynamic stall;
      utilizing the positioning element for each vane bringing the positioning element into or out of action when the vanes must be released downwind to create an aerodynamic stall.

\* \* \* \* \*